United States Patent [19]

Knuth

[11] 4,413,216

[45] Nov. 1, 1983

[54] STATIC FREQUENCY CHANGER FOR FEEDING SYNCHRONOUS MACHINES

[75] Inventor: Detlef Knuth, Berlin, Fed. Rep. of Germany

[73] Assignee: Licentia Patent-Verwaltungs-GmbH, Frankfurt am Main, Fed. Rep. of Germany

[21] Appl. No.: 331,304

[22] Filed: Dec. 16, 1981

Related U.S. Application Data

[63] Continuation of Ser. No. 936,518, Aug. 24, 1978, abandoned.

[30] Foreign Application Priority Data

Aug. 25, 1977 [DE] Fed. Rep. of Germany ....... 2738562

[51] Int. Cl.³ ............................................. H02P 5/40
[52] U.S. Cl. ................................... 318/721; 318/722; 318/803; 318/809
[58] Field of Search ............... 318/720, 721, 722, 801, 318/802, 803, 809, 810, 811, 812

[56] References Cited

U.S. PATENT DOCUMENTS 3,512,067  5/1970  Landau ................................ 318/803
3,697,843 10/1972  Reiss ................................ 318/810 X
3,793,573  2/1974  Tsuboi ............................. 318/722 X
4,002,958  1/1977  Akamatsu ......................... 318/722 X
4,072,882  2/1978  Wiart et al. ....................... 318/722 X
4,161,680  7/1979  Akamatsu ........................... 318/722

FOREIGN PATENT DOCUMENTS 1563265  3/1970  Fed. Rep. of Germany ...... 318/721
2448447  5/1975  Fed. Rep. of Germany ...... 318/801
2726410 12/1978  Fed. Rep. of Germany ...... 318/801
4425265 10/1969  Japan ................................ 318/720
45-20864  7/1970  Japan ................................ 318/722

*Primary Examiner*—J. V. Truhe
*Assistant Examiner*—Richard M. Moose
*Attorney, Agent, or Firm*—Spencer, Kaye & Frank

[57] ABSTRACT

A static frequency changer for feeding a synchronous machine and composed of a mains side static converter, a machine side static converter and a direct current intermediate circuit connected between the converters, is further provided with an additional static converter connected at the machine side in parallel opposition to the machine side static converter, and a direct voltage capacitor connected in parallel to the additional converter.

3 Claims, 2 Drawing Figures

4,413,216

STATIC FREQUENCY CHANGER FOR FEEDING SYNCHRONOUS MACHINES

CROSS-REFERENCE TO RELATED APPLICATION

This application is a continuation of application Ser. No. 936,518, filed Aug. 24th, 1978, now abandoned.

BACKGROUND OF THE INVENTION

The present invention relates to a static frequency changer for feeding a synchronous machine, the changer being of the type including an intermediate direct current circuit between a static converter receiving energy from a mains and a static converter supplying power at the desired frequency to the machine side. A circuit of this type is disclosed, for example, in the text by Heumann and Stumpe, THYRISTOREN[Thyristors], published by B. G. Teubner, Stuttgart, 1969, at pages 130/131.

The reactive commutation power for the machine side static converter is here made available by the synchronous machine through its reactances. Therefore, the machine reactances must be designed to correspond to the required commutation duration.

Whereas synchronous machines having two or four poles have heretofore been used, there is a growing demand for synchronous machines having a larger number of poles in such static frequency changers. Such use has not occurred so far because the speed setting range has been too small and high speeds could not be achieved because of the long quenching periods required by the static converter switching elements as a result of the a.c. side commutation via the machine reactances. The frequency limit of the machine side static converter, when conventional thyristors are used as the static converter switching elements, is only about 75 Hz.

SUMMARY OF THE INVENTION

It is an object of the present invention to broaden the frequency range of the machine side static converter of such a frequency changer to make possible operation of synchronous machines at high speeds.

This and other objects are accomplished according to the present invention by providing a static frequency changer of the above-described type with an additional connectable static converter connected in parallel opposition to the first machine side static converter and connected in parallel with a direct voltage capacitor. For example this can be a polarized electrolytic capacitor or a metallic paper capacitor.

With this arrangement, the switching off of the switch elements, or thyristors, in the machine side static converter is thus advantageously not effected at the alternating voltage side thereof, but at the direct voltage side with the aid of the direct voltage capacitor. Thus the intrinsic quenching time of the static converter switching elements can be approached. In the case of the presently used mains thyristors, the quenching time achieved in circuits according to the invention is less by about a factor of 3 than the quenching time resulting during commutation under control of the machine reactances. Correspondingly, the upper frequency limit of the static converter at the machine side rises to about 200 to 250 Hz. while if the present frequency range were retained, an advantageous improvement in the power factor would result.

The arrangement according to the invention simultaneously reduces the mains reactances of the frequency changer system due to the provision of the additional energy store constituted by the direct voltage capacitor in the intermediate circuit. Moreover, as a result of the low harmonics in the current waveforms in the windings of the synchronous machine due to the configuration of the static converter on the machine side, torque fluctuations and noise in the synchronous machine are likewise reduced.

Since the commutation is no longer effected via the machine reactances, it is no longer necessary, as was previously the case, to keep them as low as possible. Rather, the machine reactances can be dimensioned with wide latitude so as to reduce the harmonics.

Semiconductor elements are provided for switching in the additional static converter which is to be used preferentially in the upper speed setting range.

If the synchronous machine is to be shifted from motor operation to generator operation, it is necessary to provide for a change in polarity at the direct current side of the additional static converter. The additional switching device which would then be required can be eliminated if the additional static converter is constructed of controllable semiconductor devices.

If the machine side static converter and the additional static converter are connected together, in each phase, via a transverse choke having a center tap to which the synchronous machine is connected, then the short circuit in the machine side static converter can be controlled without problems.

DESCRIPTION OF THE PREFERRED EMBODIMENTS

Figure 1:
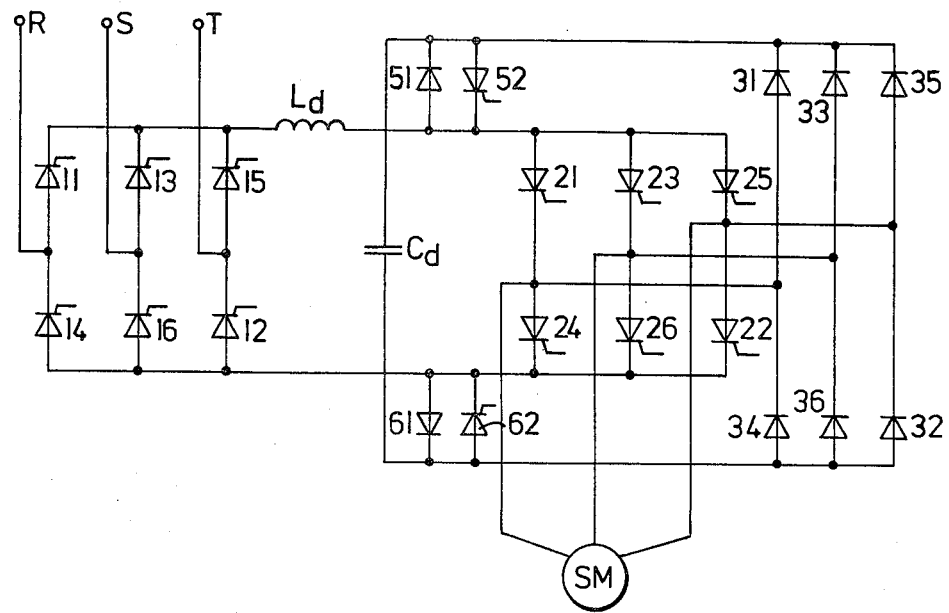
FIG. 1 is a basic circuit diagram of an intermediate circuit static frequency changer provided with an additional static converter on the machine side and a direct voltage capacitor according to one preferred embodiment of the invention.

FIG. 1 shows a static frequency changer including a mains side static converter fed from a three-phase mains RST and constituted by controllable semiconductor devices 11, 12, 13, 14, 15 and 16 which are operated in a known manner to feed, at the direct current side, via a smoothing inductance $L_d$, the primary machine side static converter constituted by controllable semiconductor devices 21, 22, 23, 24, 25 and 26. The machine side static converter is connected to the phase windings of a three-phase synchronous machine SM. Inductance $L_d$ defines a direct current intermediate circuit.

According to the invention, an additional static converter constituted by diodes 31, 32, 33, 34, 35 and 36 is connected in parallel opposition to the primary machine side static converter. A direct voltage capacitor $C_d$ is connected in parallel with the additional static converter. The additional static converter is arranged to be connected to the direct current intermediate circuit via controllable semiconductor devices 52 and 62 as well as diodes 51 and 61. To the control electrodes of the controllable semiconductor devices 52 and 62 a constant turn-on voltage must be applied.

The direct current supplied by the intermediate circuit is commutated through devices 21 to 26 of the primary machine side static converter, if semiconductor elements 51, 52, 61 and 62 are conducting, via the direct voltage capacitor $C_d$ so that the reactances (not shown) of the synchronous machine SM are relieved of the task of supplying the commutation power. Insertion of the additional static converter 31-36 into the circuit is preferably effected after the normal start of the synchronous machine SM, i.e. after keying the mains side static converter. The additional converter remains in effect over the entire machine speed range or at least over the upper part of the speed adjustment range.

Each of the controllable semiconductive devices can be constituted by an SCR.

Figure 2:
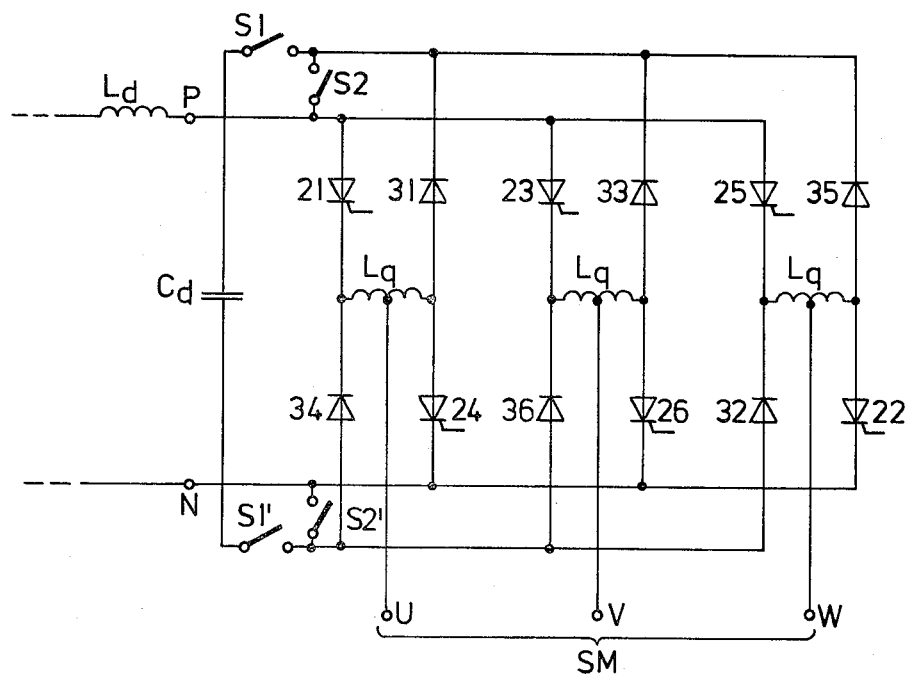
FIG. 2 is a circuit diagram of a machine side static converter with transverse choke coils according to a second embodiment of the invention.

In the embodiment shown in FIG. 2, the primary machine side static converter with controllable devices 21 to 26 and the additional static converter with diodes 31 to 36 are connected together in each phase, via a transverse choke $L_q$ having a center tap. These center taps define the terminals U, V and W leading to the synchronous machine (SM). The additional static converter and the direct voltage capacitor $C_d$ are here inserted into the converter circuit by switches S1, S2, S1' and S2', which can be mechanical switches.

For the synchronous machine to perform both generator and motor operation, it is necessary to additionally switch, or interchange, terminals P and N of the direct current intermediate circuit, or the diodes 31 to 36 of the additional static converter must be controllable switching devices.

The six pulse per cycle circuit shown in FIG. 2 can easily be expanded into a twelve-pulse circuit by the parallel connection of a second identically constructed group of machine side static converters to the direct voltage capacitor $C_d$.

It will be understood that the above description of the present invention is susceptible to various modifications, changes and adaptations, and the same are intended to be comprehended within the meaning and range of equivalents of the appended claims.

The embodiments of the invention in which an exclusive property or privilege is claimed are defined as follows:

1. In a static frequency changer for feeding a synchronous machine, including a mains side static converter, a primary machine side static converter for which the commutation power is made available by the synchronous machine, and a smoothing inductance connecting the converters together, the improvement comprising: means defining an additional static converter composed of a plurality of diodes; a direct voltage capacitor connected in parallel to said additional static converter to form an intermediate circuit providing a direct voltage; means for connecting said primary machine side static converter and said additional static converter to the synchronous machine; and switch elements and control means therefor selectively connecting said capacitor and said additional converter in parallel with said primary machine side converter, with said additional converter connected in parallel opposition to said primary machine side converter, said switch elements and said control means therefor being switchable in dependence on the speed of rotation of the synchronous machine for connecting said additional converter to said primary machine side converter at least during operation of the machine in the upper portion of its speed range.

2. An arrangement as defined in claim 1 wherein said switching elements comprise semiconductor devices.

3. An arrangement as defined in claim 1 or 2 wherein the synchronous machine is a plural phase machine, each of said primary and additional converters is composed of a plurality of phases equal in number to the number of phases of the machine, and said connecting means comprise a plurality of transverse chokes each connecting a respective phase of said primary converter to a respective phase of said additional converter and each having a center tap connectable to a respective phase of the machine.

* * * * *